United States Patent [19]

White

[11] Patent Number: 4,737,547

[45] Date of Patent: Apr. 12, 1988

[54] POLYOLEFIN BLENDS CONTAINING REACTIVE AGENTS

[75] Inventor: George White, Glenburnie, Canada

[73] Assignee: Du Pont Canada Inc., Mississauga, Canada

[21] Appl. No.: 872,945

[22] Filed: Jun. 11, 1986

Related U.S. Application Data

[63] Continuation-in-part of Ser. No. 756,224, Jul. 18, 1985, abandoned.

[30] Foreign Application Priority Data

Jul. 18, 1984 [GB] United Kingdom ............... 8418359
Nov. 15, 1984 [GB] United Kingdom ............... 8428914
Jun. 27, 1985 [CA] Canada ................................ 485659

[51] Int. Cl.$^4$ .................. C08L 23/26; C08L 51/06
[52] U.S. Cl. ............................. 525/193; 525/194; 525/240; 525/199
[58] Field of Search .................. 525/240, 194, 193

[56] References Cited

U.S. PATENT DOCUMENTS

| | | | |
|---|---|---|---|
| 3,125,547 | 3/1964 | Blatz | 525/199 |
| 4,267,080 | 5/1981 | Yokoyama et al. | 525/194 |
| 4,338,227 | 7/1982 | Ballard | 525/194 |
| 4,368,280 | 1/1983 | Yui et al. | 524/515 |
| 4,390,666 | 6/1983 | Moriguchi et al. | 525/194 |
| 4,397,992 | 8/1983 | Johansson et al. | 524/534 |
| 4,678,834 | 7/1987 | Boivin et al. | 525/74 |

*Primary Examiner*—Carman J. Seccuro

[57] ABSTRACT

A polyolefin blend comprising, in physical admixture, a major portion of particles of a first polyethylene and a minor portion of particles of a composition of a second polyethylene, is disclosed. The first polyethylene is selected from the group consisting of homopolymers of ethylene and copolymers of ethylene and at least one $C_4$–$C_{10}$ higher alpha-olefin, and the second polyethylene is a copolymer of ethylene and at least one $C_4$–$C_{10}$ higher alpha-olefin having a density of at least 0.890 g/cm$^3$, especially at least 0.910 g/cm$^3$, and a melt index of at least 40 dg/min. The density of the second polyethylene is at least about 0.005 g/cm$^3$ lower than that of the first polyethylene and the melt index of the second polyethylene is at least 10 dg/min. higher than that of the first polyethylene. The composition of the second polyethylene contains an agent that is capable of reacting with polyolefins that are in a molten state. Such agents are selected from the group consisting of crosslinking agents and modifying agents, and mixtures thereof. In an alternative embodiment, the second polyethylene has a shear viscosity that is not more than 30% of that of the first polyethylene at 200° C. and a shear rate of 400 sec$^{-1}$; in this regard, the first and second polyethylene may be more broadly defined as being homopolymers and copolymers of hydrocarbon alpha-olefins having 2–10 carbon atoms. The blends may be used in a wide variety of processes, including blow-moulding processes, film and pipe extrusion processes, sheet thermoforming processes and rotational moulding processes.

33 Claims, No Drawings

POLYOLEFIN BLENDS CONTAINING REACTIVE AGENTS

CROSS-REFERENCE TO RELATED APPLICATION

This application is a continuation in part of my copending application Ser. No. 756,224, filed July 18, 1985, now abandoned.

BACKGROUND OF THE INVENTION

1. Field of the Invention

The present invention relates to polyolefin blends and in particular to a physical admixture of a major portion of particles of an ethylene polymer with a minor portion of particles of a composition of an ethylene polymer and an agent that is capable of reacting with polyolefins in the molten state, such reactive agent being a cross-linking agent and/or a modifying agent and being further defined hereinbelow.

2. Description of the Prior Art

Polymers of ethylene, for example, homopolymers of ethylene and copolymers of ethylene and higher alpha-olefins, are used in large volumes for a variety of end-uses, for example, in the form of film, fibres, moulded or thermoformed articles, pipe, coatings and the like.

Polyolefin compositions as offered for sale and/or used in such end-uses often contain reactive and/or non-reactive agents to modify or stabilize the polymer during processing or during use of articles fabricated from the compositions. Typical reactive agents include cross-linking agents and certain unsaturated compounds. Typical non-reactive agents include antioxidants and other stabilizers, nucleation agents and additives that affect the slip or blocking characteristics of products or the release of products from moulds used in fabrication processes. It is important that the incorporation of agents into polyolefin compositions be carried out so that the resultant composition has uniform properties.

Polymers having properties that are commercially-acceptable in a variety of end-uses are known. In addition, improvements in some polymer properties could lead to improved products and/or use of the polymers in additional end-uses. For instance, one method of improving the end-use characteristics of an article rotationally moulded from polymers of ethylene is to incorporate a cross-linking agent, for example, an organic peroxide, into the polymer composition. In the rotational moulding of a composition containing an organic peroxide, the polymer flows to coat the inside of the mould and then the cross-linking agent causes crosslinking of the polymer so as to increase the molecular weight of the polymer, thereby improving end-use properties of the resultant article. Cross-linkable compositions especially adapted for rotational moulding end-uses are disclosed in European Patent Publication No. 0 087 210 of G. White, published 1983 Aug. 31.

Cross-linkable compositions may also be used in other end-uses to obtain improvements in product properties; the cross-linking of the polymer will tend to affect melt characteristics of the polymer under low shear rate processing conditions. One example of the use of partial cross-linking to obtain an improvement in film properties is disclosed in Canadian Patent No. 1 123 560 of D. A. Harbourne, which issued 1982 May 18.

Techniques for the incorporation of agents into polyolefins are well known in the art. Non-reactive agents, especially stabilizing agents, are frequently incorporated into molten polymer during the process for the manufacture of the polymer. Reactive and non-reactive agents may also be incorporated into polymers by melt blending techniques in which the agent is metered into or otherwise added to molten polymer during extrusion of the polymer into pellets or a fabricated article.

It is important in the addition of agents that the agent be uniformly distributed throughout the polymer. With non-reactive agents, however, the uniformity of the distribution of the agent is normally less critical than with reactive agents. For example, the requirements for a slip agent or a stabilizer may be less critical than for a cross-linking agent. The cross-linking of a polymer increases the molecular weight of the polymer. Thus, in order to obtain a product of uniform properties, especially properties dependent on molecular weight, it is important that the cross-linking of the polymer be carried out in a uniform manner. If the cross-linking is not uniform, the resultant product may, for example, have areas of weakness due to either insufficient or excessive cross-linking of the polymer or have gel particles resulting from excessive cross-linking of the polymer, such gel particles resulting in unacceptable visual appearance and/or areas of weakness in the product. Some fabrication processes, for example blow moulding of bottles and the manufacture of sheet and film, may be more sensitive to non-uniform product properties than other processes. In order to obtain uniform product properties, it has been necessary to use expensive and/or complex processes to incorporate reactive agents into polymers, including special handling facilities and special extruder screw designs.

The blending of organic peroxide with molten polyethylene is disclosed in U.S. Pat. No. 3,182,033 of R. S. Gregorian, which issued 1965 May 04, and in Canadian Patent No. 957 473 of H. J. Cook, which issued 1974 Nov. 12. D. A. Alia disclosed in U.S. Pat. No. 4,197,381, which issued 1980 Apr. 08, that the blending of crystalline polymers and amorphous elastomeric polymers aided in the production of cross-linkable polymers having a homogeneous composition. The blending of reactive agents into polyethylene by means of a physical blend of polyethylene with a different polymer containing the reactive agent is disclosed in the application of D. W. Boivin and R. A. Zelonka, Ser. No. 756,223 filed 1985 July 18.

SUMMARY OF THE INVENTION

A blend of polyolefins capable of being used to incorporate reactive agents into polyolefins in a uniform and more economical manner has now been found.

Accordingly, the present invention provides a polyolefin blend comprising, in physical admixture, a major portion of particles of a first polyethylene and a minor portion of particles of a composition of a second polyethylene, in which the first polyethylene is selected from the group consisting of homopolymers of ethylene and copolymers of ethylene and at least one $C_4$-$C_{10}$ higher alpha-olefin, said second polyethylene being a copolymer of ethylene and at least one $C_4$-$C_{10}$ higher alpha-olefin having a density of at least 0.890 g/cm$^3$ and a melt index in the range of 40–200 dg/min., the density of the second polyethylene being at least about 0.005 g/cm$^3$ lower than that of the first polyethylene and the melt index of the second polyethylene being at least 10 dg/min. higher than that of the first polyethylene, said composition being a composition of the second polyethylene and a reactive agent selected from the group consisting of cross-linking agents and modifying agents, and mixtures thereof, said reactive agent being capable of reacting with said polyethylene in a molten state.

In a preferred embodiment of the blends of the present invention, the reactive agent is a cross-linking agent which is an organic peroxide.

In a further embodiment, the reactive agent is a modifying agent.

In another embodiment, the melt index of the second polyethylene is 40–60 dg/min higher than that of the first polyethylene.

The present invention also provides a polyolefin blend comprising, in physical admixture, a major portion of particles of a first polyethylene and a minor portion of particles of a composition of a normally solid second polyethylene, in which the first polyethylene is selected from the group consisting of homopolymers of ethylene and copolymers of ethylene and at least one $C_4$–$C_{10}$ higher alpha-olefin, said second polyethylene being a copolymer of ethylene and at least one $C_4$–$C_{10}$ higher alpha-olefin having a density of at least 0.890 g/cm$^3$ and a melt index of at least 40 dg/min., said second polyethylene having a shear viscosity that is not more than 30% of that of said first polyethylene when measured at 200° C. and a shear rate of 400 sec$^{-1}$, said composition being a composition of the second polyethylene and a reactive agent selected from the group consisting of cross-linking agents and modifying agents, and mixtures thereof, said reactive agent being capable of reacting with polyethylenes in a molten state.

In a preferred embodiment, the shear viscosity of the second polyethylene is 5–15% of that of the first polyethylene.

The present invention further provides a polyolefin blend comprising, in physical admixture, a major portion of particles of a first polyolefin and a minor portion of particles of a composition of a normally solid second polyolefin, said polyolefins being selected from the group consisting of homopolymers and copolymers of hydrocarbon alpha-olefins having 2–10 carbon atoms, said second polyolefin having a shear viscosity that is not more than 30% of that of said first polyolefin when measured at 200° C. and a shear rate of 400 sec$^{-1}$, said composition being a composition of the second polyolefin and a reactive agent selected from the group consisting of cross-linking agents and modifying agents, and mixtures thereof, said reactive agent being capable of reacting with said polyolefins in a molten state.

In addition, the present invention provides a process for the manufacture of articles from a polyolefin and a reactive agent capable of reacting with the polyolefin in a molten state, comprising feeding to melt processing apparatus a polyolefin blend comprising, in physical admixture, a major portion of particles of a first polyolefin and a minor portion of particles of a composition of a normally solid second polyolefin, said polyolefins being selected from the group consisting of homopolymers and copolymers of hydrocarbon alpha-olefins having 2–10 carbon atoms, said second polyolefin having a shear viscosity that is not more than 30% of that of said first polyolefin when measured at 200° C. and a shear rate of 400 sec$^{-1}$, said composition being a composition of the second polyolefin and a reactive agent selected from the group consisting of cross-linking agents and modifying agents, and mixtures thereof, melting and admixing said blend and forming an article from the resultant blend. The invention also provides processes for the manufacture of articles from the other blends described herein.

DETAILED DESCRIPTION OF THE INVENTION

The polyolefin of the blends of the present invention is particularly described herein with reference to such polyolefins being a homopolymer of ethylene and/or a copolymer of ethylene and a minor amount of at least one $C_4$–$C_{10}$ higher alpha-olefin, for example a copolymer of ethylene and a minor amount of butene-1, hexene-1 and/or octene-1. It is to be understood, however, that the polyolefins may be broadly defined as being homopolymers or copolymers of hydrocarbon alpha-olefins having 2–10 carbon atoms. Techniques for the manufacture of such polymers are known in the art.

As noted above, the invention is particularly defined with reference to the polyolefins being homopolymers and copolymers of ethylene.

The characteristics of the first polyethylene, for example, the density and melt index of the polymer, will depend to a large extent on the intended end-use of the resultant products but, in embodiments, the density may range from about 0.890 g/cm$^3$ to about 0.970 g/cm$^3$ and the melt index, as measured by the method of ASTM D-1238 (condition E), may range up to about 100 dg/min. For example, polymers intended for film and sheet end-uses tend to have melt indices of less than about 10 dg/min whereas polymers intended for moulding end-uses tend to have higher values of melt index. The ranges of density and melt index of polyolefins that are useful for various types of products are known in the trade.

The characteristics of the second polyethylene differ from those described above for the first polyethylene. In one embodiment, the density of the second polyethylene is lower than that of the first polyethylene, being at least 0.890 g/cm$^3$, especially at least 0.910 g/cm$^3$, but with the proviso that it is at least about 0.005, especially 0.008 g/cm$^3$ lower than the density of the first polyethylene. Secondly, the melt index of the second polyethylene is higher than that of the first polyethylene, being in the range of 40–200, especially 60–150 dg/min., but with the proviso that it is at least 10 dg/min., preferably at least 20 dg/min., higher than the melt index of the first polyethylene.

In an alternate embodiment, the second polyethylene has a density of at least 0.890 g/cm$^3$, especially at least 0.910 g/cm$^3$, a melt index of at least 40 dg/min. and has a lower shear viscosity than the first polyethylene; in particular the shear viscosity is not more than 30% of that of the first polyethylene. As used herein, shear viscosity is apparent shear viscosity determined by capillary rheology at 200° C. at an apparent shear rate of 400 sec$^{-1}$.

In preferred embodiments of the invention, the shear viscosity of the second polyolefin is 5–15% of that of the first polyolefin.

The second polyolefin is a normally solid polymer and may include materials frequently referred to as solid waxes but does not include materials that are liquids at ambient temperatures and pressures; the blends of the invention are physical admixtures and are therefore capable of physical separation into the respective components at ambient temperatures.

The second polyethylene contains a reactive agent selected from the group consisting of cross-linking agents and modifying agents, and mixtures thereof. As used herein, the expression "reactive agent" refers to an agent that undergoes a chemical reaction at temperatures at which polyethylene is in a molten state. It is to be understood, however, that the rate of chemical reaction may not be significant until the temperature of the molten polyethylene is substantially above the melting point of the polyethylene. For example, it is known that cross-linking agents for polyethylene are usually selected so that the cross-linking reaction occurs above the melting point of the polymer e.g. at or near normal melt processing temperatures. It is preferred that the reaction temperature be such that adequate mixing of polymer and reactive agent may be achieved prior to extensive reaction between polymer and reactive agent; the half-life of a cross-linking agent is usually known over a range of temperatures and may be used to assist in selection of a cross-linking agent suitable for an intended end-use. It is to be understood that the reactive agent may be more than one chemical compound or species and, in that event, part of the composition of the second polyethylene may contain one reactive agent and another part of the composition of the second polyethylene may contain a second reactive agent. It is to be further understood that if the reactive agent is more than one chemical compound or species, then each such reactive agent may be capable of reacting with polyethylene that is in a molten state and/or one such reactive agent may be capable of reacting with another such reactive agent.

In the event that the reactive agent is a cross-linking agent e.g. an organic peroxide, the first polyethylene may, but normally will not, contain organic peroxide. However, it may under some circumstances be desirable to incorporate portions of the cross-linking formulation into the first polyethylene. For example, if the cross-linkable composition is to be comprised of both an organic peroxide and a co-curing agent, as is disclosed in the aforementioned publication of G. White, it might be advantageous to admix the co-curing agent with the first polyethylene and to admix the organic peroxide with the second polyethylene. Such an incorporation of the co-curing agent into the first polyethylene may aid in the fabrication of a uniform product. In any event, the first polyethylene will often contain non-reactive agents known to be incorporated into polyethylene including antioxidants and other stabilizers, pigments and the like, it being understood that some so-called non-reactive agents useful in polyethylene may have detrimental effects on cross-linking or other reactive agents useful with polyethylene and as such will likely not be used in combination with such cross-linking or other reactive agents.

For blends containing cross-linking agents, the preferred cross-linking agent is an organic peroxide, especially a bis(tert. alkyl peroxy alkyl) benzene, dicumyl peroxide or acetylenic diperoxy compound. Other organic peroxides are known to those skilled in the art, including t-butyl hydroperoxide and di-t-butyl peroxide. 2,5-Dimethyl-2,5 bis(tert. butyl peroxyisopropyl)-benzene is the preferred organic peroxide and is available commercially under the trade mark Vulcup from Hercules Incorporated. As an alternative, the cross-linking agent may be 2,5-dimethyl-2,5-di(t-butylperoxy)hexyne-3 which is available commercially under the trade mark Lupersol 130 from Lucidol Division of Pennwalt Corporation. In an embodiment, the composition of the second polyethylene may be similar to compositions disclosed in the aforementioned publication of G. White except that the polyethylene would be selected so as to meet the requirements of the present invention. While the amount of cross-linking agent in the second polyethylene may be varied over a wide range it may be preferable not to have a high concentration of cross-linking agent in the second polyethylene and to then admix only a small amount of the second polythylene with the first polyethylene. In that event, problems may be experienced in mixing the relatively high concentration of cross-linking agent in the second polyethylene in a uniform manner into the first polyethylene. If the cross-linking agent is an organic peroxide, it is preferred that less than 4% by weight of peroxide be present in the second polyethylene and preferably 0.05–1.0% by weight of peroxide.

As noted above, a co-curing agent may be incorporated into the first or second polyethylene i.e. either separately from or admixed with cross-linking agent. Examples of co-curing agents include triallyl cyanurate, triallyl isocyanurate and 1,2-polybutadiene.

The reactive agent may be a modifying agent, which may be used either alone or, usually, in combination with an initiator. Examples of modifying agents include unsaturated organic acids, and derivatives thereof, e.g. acrylic acid, methacrylic acid, maleic acid, fumaric acid, itaconic acid, crotonic acid, maleic anhydride, cross-linkable silane compounds e.g. vinyltrimethoxysilane, vinyltriethoxysilane, vinyltris(2-methoxyethoxy) silane and vinylmethyldimethoxysilane, and other compounds capable of being reacted with molten polyethylene. The use of sulphur trioxide-trimethylamine complex, as the modifying agent is described and claimed in the copending patent application of J. R. B. Boocock Ser. No. 756,225 filed 1985 July 18. The modifying agents will usually be used in combination with an initiator especially a cross-linking agent e.g. an organic peroxide. With some modifying agents, other initiators are known e.g. styrene acts as an initiator for maleic anhydride. The modifying agent and initiator may be separately admixed with the second polyethylene as compositions thereof. Under some processing conditions, modifying agents may react with polyethylene in the polyethylene in the substantial absence of an added initiator. For example, it is known to thermally react maleic anhydride with polyethylene at temperatures of at least about 375° C.

The polyethylenes of the blend may contain a stabilizing agent e.g. an antioxidant or an ultra violet stabilizer. Examples of antioxidants are hindered phenolic antioxidants e.g. octadecyl-3,5-di-tert.butyl-4-hydroxy cinnamate and tetrakis-methylene-3-(3',5'ditert.butyl-4-hydroxyphenyl) propionate methane. Hindered phenolic antioxidants may be used in combination with a phosphite antioxidant e.g. di(stearyl)-pentaerythritol diphosphite, tris di-tert.-butyl phenyl phosphite, dilauryl thiodipropionate and bis(2,4-tert.-butylphenyl) pentaerythritol diphosphite. Examples of ultra violet stabilizers are 2-hydroxy-4-n-octoxybenzophenone, 2-(3'-tert butyl-2'-hydroxy-5'-methylphenyl)-5-chlorobenzotriazole and bis-(2,2,6,6,-tetramethyl-4-piperidyl)sebacate. Moreover, the polyethylenes of the blend may contain slip agents, anti-blocking agents, anti-static agents, mould release agents, pigments, nucleating or other processing aids or the like. Examples of slip agents are erucamide and stearamide, of anti-static agents are bis(hydroxyethyl) tallow amine and glycerol monooleate, of anti-blocking agents are silica and mica and of mould release agents are calcium stearate and zinc stearate. Examples of nucleating agents or other processing aids are talc, silica, polyethylene glycol, fluorinated elastomers and polyolefin waxes, or the like.

It has been found to be particularly advantageous to incorporate fluorinated elastomer processing aids into the blends of the present invention, especially as part of the composition of the second polyolefin. Such processing aids tend to reduce any tendency for melt fracture to occur, as is disclosed in U.S. Pat. No. 3,125,547 of P. S. Blatz, issued 1964 Mar. 17.

Melt fracture is a phenomenon that may occur during extrusion of molten polyethylene through a die. At low rates of extrusion, the extrudate may be smooth but at some higher rate the extrudate will become rough; the transition from smooth extrudate to rough extrudate may occur as the result of a relatively small increase in the rate of extrusion. The phenomenon is well known, being discussed for instance by J. P. Tordella in SPE Journal, p 36–40, Feb. 1956. Copolymers of ethylene and $C_4$–$C_{10}$ higher alpha-olefins, and especially such polymers of relatively low density which are now frequently referred to as linear low density polyethylene, tend to be particularly susceptible to the occurrence of melt fracture.

As noted above, stabilizing or other so-called non-reactive agents may have detrimental effects on cross-linking or other reactive agents and for that reason it may be preferable not to use certain combinations of agents, as will be understood by those skilled in the art.

The ratio of the first polyethylene to the second polyethylene may be varied over a wide range, particularly from about 5:1 to about 400:1 and especially about 50:1 to about 100:1. The ratio selected will depend on a variety of factors, including the amount of reactive agent (or of additional reactive agent) to be incorporated into the blend, the type(s) of reactive agent, the need for a uniform product, the type of processing that the resultant blend is to be subjected to and the mixing capabilities of apparatus used therein and the like. With regard to the mixing capabilities of the apparatus, twin-screw extruders may be more effective than single screw extruders.

The amount of reactive agent in the blend of the present invention will depend, in particular, on the type of reactive agent and the intended end-use of the blend. Thus, the amount could vary, depending on such other factors, from a few parts per million (ppm) in the blend to in excess of one per cent, by weight. Such amounts will be understood by those skilled in the art.

In the event that the reactive agent is a cross-linking agent, the first and second polyethylenes may be selected and admixed so that the amount of cross-linking agent in the blend is in the range of about 25 ppm to about 1000 ppm by weight of the blend. The amount of cross-linking agent in the blend will depend primarily on the intended end-use for the blend. Blends intended for the fabrication of the more highly cross-linked products will have relatively high levels of cross-linking agents; the present invention would normally not be used to produce products cross-linked to the extent that gel is formed or that the shear viscosity of the first polyethylene is increased to more than five times its original value, especially in the manufacture of film. On the other hand, a small amount of cross-linking agent may be present in the blend so as to effect only a relatively low level of crosslinking of the resultant product.

The particles of the first and second polyethylenes may be any convenient shape and size and may for example be granules, powder, pellets or the like. Such forms are commercially available forms of polyethylene and/or may be obtained by known techniques e.g. grinding, melt pelletization and the like. However, it is preferred that the particles of the first polyethylene be of substantially the same size as the particles of the composition of the second polyethylene. As the difference in size between the particles increases, so does the possibility that the two types of particles will become separated from one another during storage, transportation or other handling of the blend; such differences may be less critical if the blend is fed to an extruder shortly after preparation thereof.

The composition of the second polyethylene may be produced by techniques known in the art for incorporating agents into polyethylene. Such methods include melt blending, coating and extrusion, and injection of the agent into molten polyethylene. If the reactive agent is a modifying agent or especially a cross-linking agent, the reactive agent should be incorporated into the polyethylene in a manner that does not result in premature reaction with the polyethylene, as in known in the art.

The blends of the present invention may be used for the incorporation of reactive agents into polyethylene, especially in a versatile and economic manner. The resultant blends may be used in a wide variety of end-uses, as is known for polyethylene. Such uses include blow-moulding processes, film and pipe extrusion processes, sheet thermoforming processes and rotational moulding processes. Apparatus used in such processes is referred to herein as melt processing apparatus. In particularly preferred embodiments, the blends are used in the manufacture of film in a blown film process. As is illustrated hereinafter, such a use of the blends can result in substantial increases in the rate of production of film of acceptable quality. However, for any particular combination of apparatus, polymer composition and processing conditions, there may be an optimum level of cross-linking agent above which increases in the rate of film production, if any, may be at the detriment of film quality.

The present invention is illustrated by the following examples. All parts, percentages and properties are by weight unless otherwise indicated.

EXAMPLE I

A composition of an ethylene/butene-1 copolymer, with 0.55% by weight of Vulcup R organic peroxide and 0.55% by weight of triallyl isocyanurate, was prepared by a meltblending technique. The copolymer had a density of 0.950 g/cm$^3$, a melt index of 50 dg/min, and a shear viscosity of 800 poise.

The composition was admixed with SCLAIR* 58A polyethylene, a copolymer of ethylene and butene-1 having a density of 0.955 g/cm$^3$, a melt index of 0.43 dg/min and a shear viscosity of 3580 poise, in a ratio of polyethylene:composition of 100:1, to give a blend of the present invention. The resultant blend was fed to a blow moulding machine equipped with a short screw, which did not have good mixing characteristics, and with a mould for the fabrication of one gallon bottles. The bottles obtained were of good quality, being free of gel particles. Further details are given below, as Run 1.
*denotes trade mark As a comparison, the corresponding composition having an ethylene homopolymer, with a density of 0.960 g/cm³, a melt index of 21 dg/min and a shear viscosity of 1700 poise, and the organic peroxide and triallyl isocyanurate was prepared. A blend of this composition and SCLAIR 58A polyethylene (1:100) was prepared and fed to the blow moulding machine. It was found that the polymer contained pellet-sized particles of gel. In addition the polymer melt failed to fill the bottle cavity and the bottles obtained were incomplete and full of holes. Further details are given below as Run 2.

Further details are as follows:

|  | Run No. | | |
| --- | --- | --- | --- |
|  | 1 | 2 | 3** |
| Diameter swell, %[1] | 42.3 | 43.6 | 52.5 |
| Weight swell, %[2] | 474 | 394 | 493 |
| Parison melt strength sec/100 g[3] | 98 | 47.6 | 20.9 |

[1]Defined as (width of parison/0.5 × circumference of die orifice)-1, expressed as a percentage. Measured at a shear rate of 9000 sec⁻¹ in a blow moulding process (1.8 liter bottles).
[2]Defined as (actual weight of parison/theoretical weight of parison)-1, expressed as a percentage. Measured at a shear rate of 9000 sec⁻¹ as in (1) above. The theoretical weight of the parison is the weight in the absence of swell anddrawdown.
[3]The time in seconds that a parison weighing 100 g will hang freely from the die of a blow moulding apparatus.
**Comparative data for SCLAIR 58A polyethylene that does not contain organic peroxide and triallyl isocyanurate.

This example shows that compositions of the present invention may be used in the blow moulding of bottles.

EXAMPLE II

A composition of an ethylene/butene-1 copolymer with 0.25% by weight of Vulcup R organic peroxide and 0.25% by weight of triallyl isocyanurate was prepared by a melt-blending technique. The copolymer had a density of 0.924 g/cm³, a melt index of 53 dg/min and a shear viscosity of 620 poise.

The composition was admixed with SCLAIR 13J4 polyethylene, an ethylene/octene-1 copolymer having a density of 0.926 g/cm³, a melt index of 1.0 dg/min and a shear viscosity of 5440 poise, in a ratio of polyethylene: composition of 50:1, to give a blend of the present invention.

The resultant blend was fed to apparatus for the manufacture of film by a blown film technique. The film had a thickness of 25 m. It was found that a gel-free film could be produced and that the film has a higher melt strength than film produced from SCLAIR 13J4 polyethylene that did not contain the composition of organic peroxide. The higher melt strength permitted an increase in the rate of production of film of 40%.

Subsequent testing showed that the impact strength and tensile strength of the film were not adversely affected by the use of the composition of organic peroxide and/or the higher production rate.

EXAMPLE III

A linear low density polyethylene identified as ESSO* LL1041-49, which was in granular form and had a density of 0.918 g/cm³, a melt index of 1.0 dg/min and a shear viscosity of 6250 poise, was extruded into film using a blown film process. The film produced had a thickness of 50 m. It was found that the maximum production rate obtainable with the apparatus and processing conditions being used was 38.6 kg/hr. The production rate was limited by, in particular, stability of the bubble in the blown film process and melt fracture of the polymer at the die lips.

*denotes trade mark

A pelletized composition of a melt-processing aid and 1000 ppm of Lupersol 130 organic peroxide in an ethylene/butene-1 copolymer having a density of 0.920 g/cm³, a melt index of 1.40 dg/min and a shear viscosity of 5250 poise, was blended into the above linear low density polymer so as to provide 5% of the composition in the polymer. When film was produced using the method described above, the polymer did not exhibit melt fracture. However, the level of gel in the film was too high to permit an evaluation of any increased stability of the bubble.

The above composition was replaced, at a 2% level, with a pelletized composition of 2500 ppm of Lupersol 130 organic peroxide in an ethylene/butene-1 copolymer having a density of 0.924 g/cm³, a melt index of 53 dg/min and a shear viscosity of 620 poise. On extrusion of the blend into film, it was found that the film obtained was essentially free of gel and that it was possible to increase the production rate by 47%, to 56.7 kg/hr.; melt fracture was not experienced during the trial.

This example shows that good quality film is obtainable according to the present invention even if the first polyolefin is in granular form and the second polyolefin is in pelletized form.

EXAMPLE IV

In a series of runs, ethylene/alpha-olefin copolymer pellets containing Lupersol 130 organic peroxide were blended with SCLAIR 13J4 polyethylene, an ethylene/octene-1 copolymer having a density of 0.926 g/cm³, a shear viscosity of 5440 poise and a melt index of 1.0 dg/min. The resultant blends were extruded into film in a blown film process, the apparatus used being equipped with an efficient mixing screw. Further details of the ethylene/alpha-olefin copolymer and the results obtained are shown in Table I.

TABLE I

| Run No.* | Copolymer | | | Shear Viscosity (poise) | Film Quality |
| --- | --- | --- | --- | --- | --- |
|  | Comonomer | Density | Melt Index | | |
| 1 | octene-1 | 0.926 | 1.0 | 5440 | poor |
| 2 | butene-1 | 0.924 | 5.1 | 2810 | fair |
| 3 | butene-1 | 0.924 | 20.0 | 1330 | good |
| 4 | octene-1 | 0.926 | 1.0 | 5440 | poor |
| 5 | butene-1 | 0.924 | 5.1 | 2810 | poor |
| 6 | butene-1 | 0.924 | 20.0 | 1300 | good |

*In Runs 1 to 3, 1.0% by weight of pellets containing 5000 ppm of peroxide were used; in the remaining runs, 2% by weight of pellets containing 5000 ppm of peroxide were used.

The results show that when the polymer containing the peroxide has a melt viscosity that is about the same as that of major component, film of good quality was not obtained. When the melt viscosity of the polymer containing peroxide was reduced to 50% of the major polymer component, as in Runs 2 and 5, film quality was marginal, being dependent on the amount of peroxide used. However, when the melt viscosity of the polymer containing peroxide was only of that of the major polymer component, good quality film was obtained.

In a related series of runs, attempts were made to extrude film from a number of blends using apparatus equipped with an inefficient mixing screw. It was found that even when the melt viscosity of the polymer containing peroxide was reduced to 5% of that of the major component, the peroxide concentration had to be less than 2500 ppm in order to obtain film of good quality. Thus the present invention will permit the manufacture of film using apparatus having an inefficient mixing screw, although more efficient mixing screws are preferred.

EXAMPLE V

About 1500 g of SCLAIR 2114 polyethylene, an ethylene/butene-1 copolymer having a density of 0.924 g/cm$^3$, a shear viscosity of 620 poise and a melt index of 53 dg/min, were ground in an Abbe* cutter equipped with a 0.48 cm mesh screen. About 45 g of sulphur trioxide-trimethylamine complex was dissolved in 600 ml of distilled water at 50° C. and, with minimal delay, was distributed on the particles of polyethylene in a Henschel* mixer maintained at 90° C. Nitrogen was continuously passed through the mixer for a period of 20 minutes to remove water vapour. The resultant coated particles, which were still moist, were dried overnight in a vacuum oven at 95° C.
* denotes trade mark A masterbatch was prepared by extruding the thus dried mixture from a 1.90 cm single screw Brabender* extruder, equipped with a mixing screw, at a melt temperature of 182° C. The extrudate was cooled in a water bath, cut in a strand cutter and dried overnight under vacuum. The calculated amount of sulphur trioxide-trimethylamine complex in the masterbatch was 2.9% by weight.
* denotes trade mark A physical admixture of 23g of the masterbatch and 660g of SCLAIR 13-11E polyethylene, an ethylene/butene-1 copolymer having a density of 0.920 g/cm$^3$, a melt index of 1.40 dg/min and a shear viscosity of 5250 poise, was prepared. The admixture was extruded from the Brabender extruder, now equipped with a venting screw and a breaker plate, at a melt temperature of 256° C. to form cast film having a width of 13.5 cm and a thickness of 50 μm. The hold-up time in the extruder was estimated to be 2.5–5 minutes.

The film thus obtained was dyeable with basic dyes in a uniform manner, whereas film from either SCLAIR 2114 or SCLAIR 13-11E polyethylene is not dyeable, as is disclosed in copending patent application No. 756 225 of J. R. B. Boocock et al., filed 1985 July 18, which is directd to the modification of polyethylene using sulphur trioxide-trimethylamine complex. In addition, the film did not show evidence of significant amounts of black specks, which are produced if a powder of the complex is reacted with polyethylene, thereby indicating that the complex had been uniformly dispersed in the SCLAIR 2114 polyethylene prior to reaction with the polyethylene.

EXAMPLE VI

A physical admixture of an ethylene/butene-1 copolymer having a density of 0.920 g/cm$^3$, a melt index of 1.4 dg/min and a shear viscosity of 5250 poise, a concentrate of an organic peroxide cross-linking agent and maleic anhydride was prepared in a Henschel* mixer such that the admixture contained 50 ppm of cross-linking agent and 1% by weight of maleic anhydride. The concentrate of the cross-linking agent was in the form of pellets of an ethylene/butene-1 copolymer having a density of 0.924 g/cm$^3$, a melt index of 53 dg/min and a shear viscosity of 620 poise, containing Lupersol 130 organic peroxide. The maleic anhydride was in the form of powder.
*denotes trade mark The mixture was blended in the Henschel mixer for five minutes at a maximum temperature of about 70° C. and then extruded through a corotating twin screw extruder, the first two zones of which were at a temperature of 180° C. and the remaining zones at a temperature of 200° C.

A maleic anhydride-grafted polymer containing 0.56% by weight of maleic anhydride was obtained; the melt index of the polymer was 0.53.

Films of the grafted polymer were pressed onto aluminum foil, nylon film and ethylene/vinyl alcohol copolymer film at a temperature of about 180° C. Good adhesion of the grafted polymer to the foil or film substrate was observed in each instance.

This example illustrates the use of the present invention with a modifying agent. The reaction of maleic anhydride with ethylene/butene-1 copolymers is discussed further in the copending application No. 756,176 of R. A. Zelonka and C. S. Wong filed 1985 July 18.

EXAMPLE VII

An ethylene/butene-1 copolymer having a density of 0.959 g/cm$^3$, a melt index of 85 dg/min and a shear viscosity of 340 poise, was blended with 2500 ppm of t-butylhydroperoxide. The resulting blend was physically admixed with pellets of an ethylene/butene-1 copolymer having a density of 0.920 g/cm$^3$, a melt index of 5.5 dg/min and a shear viscosity of 2630 poise, in ratios of from 3:97 to 6:94.

The admixtures thus obtained were fed to a process for the extrusion coating of paper. The extruded admixture had higher melt strength such that the line speed of the extrusion coating line could be increased from 26 m/minute, in the absence of the peroxide blend, to 46 m/minute.

EXAMPLE VIII

An ethylene/butene-1 copolymer having a density of 0.924 g/cm$^3$, a melt index of 53 dg/min and a shear viscosity of 620 poise, was blended with 2500 ppm of Lupersol 130 organic peroxide. The resulting blend was physically admixed, at a 4% and at a 6% level, with SCLAIR 58A ethylene homopolymer which has a density of 0.960 g/cm$^3$, a melt index of 0.43 dg/min and a shear viscosity of 3580 poise. The resulting blends were extruded into sheet having a thickness of 5 mm.

The sheets thus obtained were free of gel, had higher melt strength than the corresponding sheets formed from SCLAIR 58A polyethylene and gave improved performance in the thermoforming process.

EXAMPLE IX

Physical admixtures of SCLAIR 13-11E ethylene/butene-1 copolymer, which has a density of 0.920 g/cm$^3$, a melt index of 1.4 dg/min and a shear viscosity of 5250 poise, organic peroxide and maleic anhydride were prepared.

The organic peroxide (Peroxide Concentrate) was in the form of pellets of a composition of Sclair 2114 polyethylene, an ethylene/butene-1 copolymer having a density of 0.924 g/cm$^3$, a melt index of 53 dg/min and a shear viscosity of 620 poise, with 4000 ppm of Lupersol 130 organic peroxide and 4000 ppm of triallyl isocyanurate. The maleic anhydride was either in the form of a powder or a blend in polyethylene, as shown below.

The physical admixture was fed to a 1.9 cm Brabender single screw extruder and extruded into a strand using a melt temperature of 225° C.

Adhesion tests were conducted by pressing the chopped strand into film between sheets of aluminum at a temperature of 180° C. for about 5 seconds.

Further details and the results obtained are as follows:

|  | Sample | | |
| --- | --- | --- | --- |
|  | A | B | C |
| SCLAIR 13-11E copolymer (g) | 1473 | 1331 | 1331 |
| Peroxide Concentrate (g) | 18.75 | 18.75 | 18.75 |
| Maleic anhydride* | | | |
| Powder (g) | 7.5 | — | — |
| concentrate #1 (g) | — | 150 | — |
| concentrate #2 (g) | — | — | 150 |
| Results | | | |
| Graft (as anhydride plus acid) (%) | 0.35 | 0.31 | 0.24 |
| Melt Index (dg/min.) | 0.44 | 0.64 | 0.72 |
| Adhesion** | 3 | 2 | 1 |

*In Sample A, the maleic anhydride was in the form of a powder; In Sample B, the maleic anhydride was in the form of maleic anhydride deposited on ground Sclair 2114 polyethylene from the melt in a rotary evaporator (Concentrate #1, which contained about 5% by weight of maleic anhydride); In Sample C, the maleic anhydride was in the form of maleic anhydride deposited onto ground SCLAIR 2114 polyethylene by evaporation of a solution at 60-65° C. in a rotary evaporator followed by application of a vacuum and cooling to ambient temperature (Concentrate #2, which contained about 5% by weight of maleic anhydride).
**Estimated order of strength of adhesion (1 = best). The adhesion obtained with Sample A was very poor.

This example illustrates that direct addition of maleic anhydride to the polymer resulted in a grafted product exhibiting very poor adhesion. Use of the high melt index polymer to add the maleic anhydride resulted in significantly superior adhesion.

EXAMPLE X

A linear low density polyethylene, which was an ethylene/butene-1 copolymer having a density of 0.920 g/cm$^3$, a melt index of 1.0 dg/min., and a shear viscosity of 6000 poise and containing no additives other than antioxidant, was extruded through a 6.25 cm extruder equipped with an annular die having a diameter of 10 cm. The die gap was 0.75 mm and the melt temperature of the polyethylene was 200° C. The film blow-up ratio was 2.5:1 and the resultant film had a thickness of 0.1 mm.

Melt fracture was observed in the extrusion of the polyethylene at an extrusion rate of as low as about 7 kg/hour. However, film could still be manufactured at extrusion rates of up to about 58 kg/hour at which time the film bubble in the blown film extrusion process became unstable as a result of insufficient melt strength of the polyethylene.

While continuing to operate the process, 1.5% by weight of a concentrate was fed to the extruder along with the polyethylene. The concentrate was a linear low density polyethylene, an ethylene/butene-1 copolymer having a density of 0.426 g/cm$^3$, a melt index of 73 dg/min and a shear viscosity of 210 poise, and containing 3000 ppm of Lupersol 130 peroxide and 2.6% of a fluorinated elastomer processing aid of the type disclosed in the aforementioned U.S. Pat. No. 3,125,547. After 20 minutes, melt fracture was no longer observed at the extrusion rate of 58 kg/hour. Furthermore, the extrusion rate could be increased by 20% to 71 kg/hour before the film bubble became unstable. Melt fracture was not observed at this higher extrusion rate.

The haze and gloss of film produced using the linear low density polyethylene containing the concentrate was superior to film produced using the polyethylene without concentrate, because of the absence of melt fracture.

I claim:

1. A polyolefin blend comprising, in physical admixture, a major portion of particles of a first polyolefin and a minor portion of particles of a composition of a normally solid second polyolefin, said polyolefins being selected from the group consisting of homopolymers and copolymers consisting of hydrocarbon alpha-olefins having 2-10 carbon atoms, said second polyolefin having a shear viscosity that is not more than 30% of that of said first polyolefin when measured at 200° C. and a shear rate of 400 sec$^{-1}$, said composition being a composition of the second polyolefin and a reactive agent, and mixtures thereof, said reactive agent being capable of reacting with said polyolefins in a molten state. The ratio of the weight of the first polyolefin to the second polyolefin in said blend being from 10:1 to 100:1.

2. The blend of claim 1 in which the shear viscosity of the second polyolefin is 5-15% of that of the first polyolefin.

3. The blend of claim 1 in which the reactive agent is a cross-linking agent.

4. The blend of claim 1 in which the reactive agent is an unsaturated organic acid or derivative thereof.

5. The blend of claim 1 in which the first and second polyolefins are each selected from the group consisting of homopolymers of ethylene and copolymers of ethylene and at least one C$_4$-C$_{10}$ higher alpha-olefin.

6. A polyolefin blend comprising, in physical admixture, a major portion of particles of a first polyethylene and a minor portion of particles of a composition of a normally solid second polyethylene, in which the first polyethylene is selected from the group consisting of homopolymers of ethylene and copolymers of ethylene and at least one C$_4$-C$_{10}$ higher alpha-olefin, said second polyethylene being a copolymer consisting of ethylene and at least one C$_4$-C$_{10}$ higher alpha-olefin having a density of at least 0.890 g/cm$^3$ and a melt index of at least 40 dg/min., said second polyethylene having a shear viscosity that is not more than 30% of that of said first polyethylene when measured at 200° C. and at a shear rate of 400 sec$-1$, said composition being a composition of the second polyethylene and a reactive agent, and mixtures thereof, said reactive agent being capable of reacting with said polyethylenes in a molten state. The ratio of the weight of the first polyethylene to the second polyethylene in said blend being from 10:1 to 100:1.

7. The blend of claim 6 in which the shear viscosity of the second polyolefin is 5-15% of that of the first polyolefin.

8. The blend of claim 6 in which the density of the second polyethylene is at least 0.910 g/cm$^3$.

9. The blend of claim 6 in which the reactive agent is a cross-linking agent.

10. The blend of claim 6 in which the reactive agent is an unsaturated organic acid or derivative thereof.

11. The blend of claim 9 in which, the first polyethylene contains a co-curing agent.

12. The blend of claim 6 in which the ratio of the first polyethylene to the second polyethylene is in the range of from 50:1 to 100:1.

13. A polyolefin blend comprising, in physical admixture, a major portion of particles of a first polyethylene and a minor portion of particles of a composition of a second polyethylene, in which the first polyethylene is selected from the group consisting of homopolymers of ethylene and copolymers of ethylene and at least one $C_4$–$C_{10}$ higher alpha-olefin, said second polyethylene being a copolymer consisting of ethylene and at least one $C_4$–$C_{10}$ higher alpha-olefin having a density of at least 0.890 g/cm$^3$ and a melt index in the range of 40–200 dg/min., the density of the second polyethylene being at least about 0.005 g/cm$^3$ lower than that of the first polyethylene and the melt index of the second polyethylene being at least 10 dg/min. higher than that of the first polyethylene, said composition being a composition of second polyethylene and a reactive agent, and mixtures thereof, said reactive agent being capable of reacting with said polyethylenes in a molten state. The ratio of the weight of the first polyethylene to the second polyethylene in said blend being from 10:1 to 100:1.

14. The blend of claim 13 in which the melt index of the second polyethylene is 20 dg/min. higher than that of the first polyethylene.

15. The blend of claim 13 in which the melt index of the second polyethylene is 40–60 dg/min. higher than that of the first polyethylene.

16. The blend of claim 13 in which the density of the second polyethylene is at least 0.910 g/cm$^3$.

17. The blend of claim 13 in which the density of the second polyethylene is at least 0.008 g/cm$^3$ lower than the density of the first polyethylene.

18. A process for the manufacture of articles from a polyolefin and a reactive agent capable of reacting with the polyolefin in a molten state, comprising feeding to melt processing apparatus a polyolefin blend comprising, in physical admixture, a major portion of particles of a first polyolefin and a minor portion of particles of a composition of a normally solid second polyolefin, said polyolefins being selected from the group consisting of homopolymers and copolymers consisting of hydrocarbon alpha-olefins having 2–10 carbon atoms, said second polyolefin having a shear viscosity that is not more than 30% of that of said first polyolefin when measured at 200° C. and a shear rate of 400 sec−1, said composition being a composition of the second polyolefin and a reactive agent, and mixtures thereof, melting and admixing said blend and forming an article from the resultant blend. The ratio of the weight of the first polyethylene to the second polyethylene in said blend being from 10:1 to 100:1.

19. The process of claim 18 in which the shear viscosity of the second polyolefin is 5–15% of that of the first polyolefin.

20. The process of claim 18 in which the reactive agent is a cross-linking agent.

21. The process of claim 18 in which the reactive agent is an unsaturated organic acid or derivative thereof.

22. The process of claim 18 in which the first and second polyolefins are each selected from the group consisting of homopolymers of ethylene and copolymers of ethylene and at least one $C_4$–$C_{10}$ higher alpha-olefin.

23. A process for the manufacture of articles from a polyolefin and a reactive agent capable of reacting with the polyolefin in a molten state, comprising feeding to melt processing apparatus a polyolefin blend comprising, in physical admixture, a major portion of particles of a first polyethylene and a minor portion of particles of a composition of a normally solid second polyethylene, in which the first polyethylene is selected from the group consisting of homopolymers of ethylene and copolymers of ethylene and at least one $C_4$–$C_{10}$ higher alpha-olefin, said second polyethylene being a copolymer consisting of ethylene and at least one $C_4$–$C_{10}$ higher alpha-olefin having a density of at least 0.890 g/cm$^3$ and a melt index of at least 40 dg/min, said second polyethylene having a shear viscosity that is not more than 50% of that of said first polyethylene when measured at 200° C. and at a shear rate of 400 sec−1, said composition being a composition of the second polyethylene and a reactive agent, and mixtures thereof, melting and admixing said blend and forming an article from the resultant blend. The ratio of the weight of the first polyethylene to the second polyethylene in said blend being from 10:1 to 100:1.

24. The process of claim 23 in which the shear viscosity of the second polyethylene is not more than 30% of that of the first polyethylene.

25. The process of claim 23 in which the shear viscosity of the second polyethylene is 5–15% of that of the first polyethylene.

26. The process of claim 23 which the density of the second polyethylene is at least 0.910 g/cm$^3$.

27. A process for the manufacture of articles from a polyolefin and a reactive agent capable of reacting with the polyolefin in a molten state, comprising feeding to melt processing apparatus a polyolefin blend comprising, in physical admixture, a major portion of particles of a first polyethylene and a minor portion of particles of a composition of a second polyethylene, in which the first polyethylene is selected from the group consisting of homopolymers of ethylene and copolymers of ethylene and at least one $C_4$–$C_{10}$ higher alpha-olefin, said second polyethylene being a copolymer consisting of ethylene and at least one $C_4$–$C_{10}$ higher alpha-olefin having a density of at least 0.890 g/cm$^3$ and a melt index in the range of 40–200 dg/min., the density of the second polyethylene being at least about 0.005 g/cm$^3$ lower than that of the first polyethylene and the melt index of the second polyethylene being at least 10 dg/min. higher than that of the first polyethylene, said composition being a composition of second polyethylene and a reactive agent, and mixtures thereof, melting and admixing said blend and forming an article from the resultant blend. The ratio of the weight of the first polyethylene to the second polyethylene in said blend being from 10:1 to 100:1.

28. The process of claim 22 which the rate of extrusion of polyolefin so as to form the article is higher than the rate would be for extrusion of the same polyolefin in the absence of the reactive agent.

29. The process of claim 28 in which the process is a blown film extrusion process.

30. A blend of claim 1 in which at least one of the major portion and the minor portion contains a fluorinated elastomer processing aid, the polyolefin of each of said major portion and said minor portion being a copolymer of ethylene and at least one $C_4$–$C_{10}$ higher alpha-olefin.

31. A blend of claim 1 in which at least one of the major portion and the minor portion contains a fluorinated elastomer processing aid and in which the reactive agent is a cross-linking agent, the polyolefin of each of said major portion and said minor portion being a copolymer of ethylene and a least one $C_4$–$C_{10}$ higher alpha-olefin.

32. A blend of claim 6 in which at least one of the major portion and the minor portion contains a fluorinated elastomer processing aid, the polyolefin of each of said major portion and said minor portion being a copolymer of ethylene and at least one $C_4$–$C_{10}$ higher alpha-olefin.

33. A blend of claim 6 in which at least one of the major portion and the minor portion contains a fluorinated elastomer processing aid and in which the reactive agent is a cross-linking agent, the polyolefin of each of said major portion and said minor portion being a copolymer of ethylene and a least one $C_4$–$C_{10}$ higher alpha-olefin.

* * * * *